(12) United States Patent
Kendi et al.

(10) Patent No.: US 8,119,245 B2
(45) Date of Patent: Feb. 21, 2012

(54) DUAL-CURE COATING COMPOSITIONS BASED ON POLYASPARTATES POLYISOCYANATES AND ACRYLATE-CONTAINING COMPOUNDS

(75) Inventors: Margaret A. Kendi, Coraopolis, PA (US); Terrell D. Wayt, Moundsville, WV (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 224 days.

(21) Appl. No.: 12/012,715

(22) Filed: Feb. 5, 2008

(65) Prior Publication Data

US 2009/0197092 A1    Aug. 6, 2009

(51) Int. Cl.
- *B32B 5/16* (2006.01)
- *C08G 18/67* (2006.01)
- *C08G 18/10* (2006.01)

(52) U.S. Cl. .......... 428/423.1; 522/90; 522/174; 528/75

(58) Field of Classification Search ............... 522/90, 522/174; 528/75; 428/423.1; 248/423.1
See application file for complete search history.

(56) References Cited

U.S. PATENT DOCUMENTS

| | | | |
|---|---|---|---|
| 4,247,578 A | 1/1981 | Skinner et al. | 427/44 |
| 4,342,793 A | 8/1982 | Skinner et al. | 427/44 |
| 5,126,170 A | 6/1992 | Zwiener et al. | |
| 5,684,083 A * | 11/1997 | Temple et al. | 524/541 |
| 6,107,436 A | 8/2000 | Goeb et al. | |
| 6,183,870 B1 | 2/2001 | Hergenrother et al. | 428/423.1 |
| 6,232,360 B1 | 5/2001 | Meixner et al. | |
| 6,399,736 B1 | 6/2002 | Primeaux, II et al. | 528/64 |
| 6,458,293 B1 | 10/2002 | Roesler | 252/182.23 |
| 6,482,333 B1 | 11/2002 | Roesler et al. | 252/182.12 |
| 6,599,955 B1 * | 7/2003 | Weikard et al. | 522/90 |
| 6,605,684 B2 | 8/2003 | Primeaux, II et al. | 528/68 |
| 6,790,880 B2 | 9/2004 | Purgett et al. | 523/172 |
| 6,984,715 B2 | 1/2006 | Roesler et al. | 528/332 |
| 7,041,708 B2 | 5/2006 | Le-Khac et al. | 522/97 |
| 2002/0103326 A1 | 8/2002 | Primeaux, II et al. | 528/84 |
| 2003/0060571 A1 * | 3/2003 | Weinert et al. | 525/331.6 |
| 2006/0046068 A1 * | 3/2006 | Barancyk et al. | 428/423.1 |
| 2007/0066786 A1 | 3/2007 | Hanson, Jr. et al. | 528/44 |
| 2007/0099119 A1 | 5/2007 | Rach et al. | 430/270.1 |

OTHER PUBLICATIONS

Desmodur® N-3300, Bayer Material Science, 2006, p. 1-3.*

* cited by examiner

*Primary Examiner* — Mark Eashoo
*Assistant Examiner* — Jessica Paul
(74) *Attorney, Agent, or Firm* — Robert S. Klemz; Noland J. Cheung

(57) ABSTRACT

A radiation-curable coating composition is provided. The composition comprises
a) an amino-functional polyaspartate; b) a (cyclo) aliphatic polyisocyanate; c) an acrylate-functional compound; and d) a photoinitiator. Substrates coated with the coating compositions are also provided.

21 Claims, No Drawings

DUAL-CURE COATING COMPOSITIONS BASED ON POLYASPARTATES POLYISOCYANATES AND ACRYLATE-CONTAINING COMPOUNDS

FIELD OF THE INVENTION

This invention relates to dual-cure coating compositions based on polyaspartates, polyisocyanates and acrylate-functional compounds.

BACKGROUND OF THE INVENTION

The use of polyaspartates in coating compositions leads to certain disadvantages, including inadequate chemical resistance and the need for solvent to give an adequate pot-life. The choice of polyaspartate can affect cure rates, and can be difficult because certain applications require the use of solvent, which is to be avoided. Additionally, it may be difficult to achieve a 1:1 volume ratio, due to the weight differences between the polyaspartate and polyisocyanate.

UV coatings generally also suffer from various disadvantages, such as embrittlement of thick section coating, which leads to shrinkage and cracking. Additional difficulties arise when trying to cure pigmented systems. What is needed is a dual cure coating that overcomes the disadvantages of prior art coatings.

SUMMARY OF THE INVENTION

Accordingly, it has been found that polyaspartic dual cure coatings enhance the chemical resistance of the traditional polyaspartic coatings and prolong the pot-life of the coating system without adding solvent. A faster curing coating allows for rapid return to service of the area on which the coating has been applied, and allows for cure of heavily pigmented systems and of thick sections. All of this is accomplished with the use of little or no volatile organic compounds (VOCs).

The present invention therefore, provides a radiation-curable coating composition comprising
 a) an amino-functional polyaspartate;
 b) a (cyclo) aliphatic polyisocyanate;
 c) an acrylate-functional compound; and
 d) a photoinitiator.

DETAILED DESCRIPTION OF THE INVENTION

As used herein in the specification and claims, including as used in the examples and unless otherwise expressly specified, all numbers may be read as if prefaced by the word "about", even if the term does not expressly appear. Also, any numerical range recited herein is intended to include all subranges subsumed therein.

The coating compositions of the present invention preferably have an NCO:NH ratio of (a) to (b) from 0.5 NCO:1 NH to 3 NCO:1 NH.

The amount of polyaspartate (a) and polyisocyanate (b) together comprise 15 wt. % to 70 wt. % of the composition, the amount of acrylate-functional compound (c) comprises 30 wt. %-85 wt. % of the composition, and the amount of photoinitiator (d) comprises 0.3 wt. % to 10 wt. % of the composition, based on the weight of the coating composition.

In a more preferred embodiment, the amount of a) and b) combined is from 55 wt. %-65 wt. % and the amount of c) is from 35 wt. %-45 wt. %, based on the weight of the coating composition.

The amino-functional polyaspartates used in the coating compositions of the present invention are described in U.S. Pat. Nos. 5,126,170; 5,236,741; and 5,489,704, all incorporated herein by reference. These polyaspartates comprise compounds of formula (I):

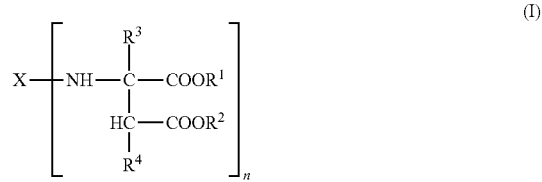

In compounds of formula (I), the residue X is preferably obtained from an n-valent polyamine selected from ethylenediamine, 1,2-diaminopropane, 1,4-diaminobutane, 1,6-diaminohexane, 2,5-diamino-2,5-dimethylhexane, 2,2,4- and/or 2,4,4-trimethyl-1,6-diaminohexane, 1,11-diaminoundecane, 1,12-diaminododecane, 1-amino-3,3,5-trimethyl-5-aminomethylcyclohexane, 2,4- and/or 2,6-hexahydrotoluylenediamine, 2,4'- and/or 4,4'-diaminodicyclohexylmethane, 3,3'-dimethyl-4,4'-diaminodicyclohexylmethane, 2,4,4'-triamino-5-methyldicyclohexylmethane and polyether polyamines with aliphatically bound primary amino groups and having a number average molecular weight $M_n$ of 148 to 6000 g/mol.

The residue X is more preferably obtained from 1,4-diaminobutane, 1,6-diaminohexane, 2,2,4- and/or 2,4,4-trimethyl-1,6-diaminohexane, 1-amino-3,3,5-trimethyl-5-aminomethylcyclohexane, 4,4'-diaminodicyclohexylmethane or 3,3'-dimethyl-4,4'-diaminodicyclohexylmethane.

The phrase "inert to isocyanate groups under the reaction conditions," which is used to define groups $R^1$ and $R^2$, means that these groups do not have Zerevitinov-active hydrogens (CH-acid compounds; cf. Römpp Chemie Lexikon, Georg Thieme Verlag Stuttgart), such as OH, NH or SH.

$R^1$ and $R^2$, independently of one another, are preferably $C_1$ to $C_{10}$ alkyl residues, more preferably methyl or ethyl residues.

When X is the residue obtained from 2,4,4'-triamino-5-methyldicyclohexylmethane, $R^1$ and $R^2$ are preferably ethyl.

$R^3$ and $R^4$ may be identical or different and represent hydrogen or organic groups which are inert towards isocyanate groups at a temperature of 100° C. or less, preferably hydrogen or $C_1$ to $C_{10}$ alkyl residues, more preferably hydrogen, methyl or ethyl residues. Most preferably, $R^3$ and $R^4$ are both hydrogen.

In formula I), n is preferably an integer from 2 to 6, more preferably 2 to 4.

The production of amino-functional polyaspartates takes place in known manner by reacting the corresponding primary polyamines of the formula

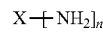

with maleic or fumaric acid esters of the formula

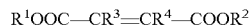

where $R^1$, $R^2$, $R^3$ and $R^4$ are as defined above.

Suitable polyamines are the above-mentioned diamines or triamines (Exp Jeffamine T-403 and NTA). Examples of suitable maleic or fumaric acid esters are dimethyl maleate, diethyl maleate, dibutyl maleate and the corresponding fumarates.

The production of amino-functional polyaspartates from the above-mentioned starting materials preferably takes place within the temperature range of 0 to 100° C. The starting materials are used in amounts such that there is at least one, preferably one, olefinic double bond for each primary amino group. Any starting materials used in excess can be separated off by distillation following the reaction. The reaction can take place in the presence or absence of suitable solvents, such as methanol, ethanol, propanol, dioxane or mixtures thereof. A particularly preferred amino-functional polyaspartate is Desmophen®NH 1420, available from Bayer MaterialScience of Pittsburgh, Pa.

The coating compositions of the present invention further comprise one or more polyisocyanates. Non-limiting examples of suitable polyisocyanates include monomeric aliphatic, cycloaliphatic, araliphatic and/or aromatic diisocyanates. Examples of diisocyanates include 1,6-diisocyanatohexane, 1-isocyanato-3,3,5-tri-methyl-5-isocyanatomethylcyclohexane(isophorone diisocyanate), 4,4-diisocyanatodicyclohexylmethane, 1,4-diisocyanatocyclohexane, 1-methyl-2,4-diisocyanatocyclohexane, 1-methyl-2,6-diisocyanatocyclohexane and mixtures thereof. 4-isocyanatomethyl-1,8-octane diisocyanate will be used without further modification.

The polyisocyanates of the aforementioned kind preferably have an NCO group content of 5 to 25% by weight, an average NCO functionality of 2.0 to 5.0, preferably 2.8 to 4.0, and a residual amount of monomeric diisocyanates, used for their preparation, of below 1% by weight, preferably below 0.5% by weight.

The polyisocyanates used in the present invention may also contain fully or partly blocked NCO groups. Methods of preparing blocked polyisocyanates and also blocking reagents are known to the person skilled in the art. Preferred blocking agents are, for example, ε-caprolactam, butanone oxime, 3,5-dimethyl-pyrazole, triazole, phenol, phenol derivatives, secondary amines and/or alkyl malonates.

Polyisocyanates containing urethane groups can be used, for example, the reaction products of 2,4- and optionally 2,6-diisocyanatotoluene or 1-methyl-2,4- and optionally 1-methyl-2,6-diisocyanatocyclohexane with substoichiometric amounts of trimethylolpropane or its mixtures with simple diols, such as the isomeric propanediols or butanediols. The preparation of polyisocyanates of this kind containing urethane groups, in virtually monomer-free form, is described in, for example, DE-A 109 01 96.

Suitable isocyanates can include oligomeric polyisocyanates including, but not limited to, dimers, such as the uretdione of 1,6-hexamethylene diisocyanate, trimers, such as the biuret and isocyanurate of 1,6-hexanediisocyanate and the isocyanurate of isophorone diisocyanate, and polymeric oligomers. Modified polyisocyanates can also be used, including, but not limited to, carbodiimides and uretdiones, and mixtures thereof. Examples of preferred polyisocyanates are those containing biuret, isocyanurate and/or iminooxadiazinedione structures. Polyisocyanates containing iminooxadiazinedione groups, and their preparation, can be found in, for example, EP-A 798 299, EP-A 896 009, EP-A 962 454 and EP-A 962 455. Particularly preferred are the aliphatic, aliphatic/cycloaliphatic and/or cycloaliphatic single-type or mixed trimers based on 1,6-diisocyanatohexane and/or isophorone diisocyanate, which are obtainable in accordance, for example, with U.S. Pat. No. 4,324,879, U.S. Pat. No. 4,288,586, DE-A 310 026 2, DE-A 310 026 3, DE-A 303 386 0 or DE-A 314 467 2, some of which are available under the designation DESMODUR® from Bayer MaterialScience of Pittsburgh, Pa. including DESMODUR® N 3200, DESMODUR® N 3300, DESMODUR® N 3400, DESMODUR® XP 2410, and DESMODUR® XP 2580.

Coating compositions of the present invention further include one or more acrylate-functional compounds. Suitable acrylate-functional compounds include all those described herein below, in connection with urethane acrylates and acrylate-functional polyisocyanates. Suitable acrylate-functional compounds can also have epoxy groups, an example of which is glycidyl(meth)acrylate, or the reaction products of equimolar amounts of acrylic or met acrylic acid and die oxide compounds, such as, for example, neopentylglycol diglycidyl ester. Reaction products of hydroxyl-containing, polymerizable monomers, such as, for example, hydroxyethyl acrylate, and diepoxides are also suitable. A preferred acrylate-containing compound is hexane diol diacrylate, sold under the trade name Sartomer SR238.

Preferably, the coating compositions of the invention include one or more urethane acrylates as described in U.S. Pat. No. 6,232,360, incorporated herein by reference. The urethane acrylate is the reaction product of at least 70 wt. % of component A1) one or more hydroxyalkyl acrylates having 2 to 4 carbon atoms in the alkyl group, optionally mixed with up to 30 hydroxyl equivalent %, based on the total weight of component A1), of other alcohols, and up to 30 wt. % of component A2) an polyisocyanate component containing an aliphatic polyisocyanate which contains isocyanurate groups, is based on 1,6-diisocyanatohexane and has an NCO content of 22 to 23.5 wt % and a viscosity at 23° C. of 800 to 1400 mPa·s, and optionally up to 30% by weight of component A2), wherein these percentages are based on the weight of component A).

The urethane acrylate is "essentially free from hydroxyl and isocyanate groups" which means that in the production of the reaction products, components A1) and A2) are used at an NCO/OH equivalent ratio of 0.9:1 to 1.1:1, preferably about 1:1.

Starting compounds A1) are hydroxyalkyl acrylates with 2 to 4 carbon atoms in the hydroxyalkyl group or, less preferably, mixtures of such hydroxyalkyl acrylates with other compounds having alcoholic hydroxyl groups. Suitable hydroxyalkyl acrylates include 2-hydroxyethyl acrylate, the isomer mixture formed by the addition of propylene oxide to acrylic acid, or 4-hydroxybutyl acrylate. 2-hydroxyethyl acrylate is preferred.

Other suitable hydroxyl compounds include mono- to trihydric aliphatic alcohols having molecular weights of 32 to 400, such as methanol, ethanol, n-hexanol, isooctanol, isododecanol, benzyl alcohol, ethylene glycol, diethylene glycol, propylene glycol, glycerol and alcohols obtained from these alcohols by alkoxylation.

Component A2) is selected from polyisocyanates having isocyanurate groups, which are based on 1,6-diisocyanatohexane (hexamethylene diisocyanate, HDI) and have an NCO content of 22 to 23.5 wt % and a viscosity at 23.degree. C. of 800 to 1400 mPa·s. These polyisocyanates are obtained in a known manner by the trimerizing HDI until the reaction mixture has an NCO content of 42 to 45, preferably 42.5 to 44.5 wt %, subsequently terminating the reaction and removing unreacted HDI by distillation to a residual content of less than 0.5 wt %.

The manufacture of component A) by reacting starting components A1) and A2) can be carried out by known methods, optionally by using suitable urethane catalysts. As previously indicated, the reaction is carried out at an NCO/OH equivalent ratio of 0.9:1 to 1.1:1, preferably about 1:1.

A preferred urethane acrylate of this embodiment is Desmolux® VP LS 2308, available from Bayer MaterialScience, Pittsburgh, Pa.

Coating compositions of the present invention can further optionally include one or more acrylate-functional polyisocyanates, as described in U.S. Pat. No. 6,599,955, incorporated herein by reference. Acrylate-functional polyisocyanates are prepared from monohydric alcohols containing (meth)acryloyl groups and di- or polyisocyanates. The urethane (meth)acrylates according to the present invention contain free isocyanate groups, prepared generally as described for urethane acrylates, above, but with the equivalent ratio of NCO groups to OH groups being 1:0.2 to 1:0.8, preferably 1:0.3 to 1:0.6.

Monohydric alcohols containing (meth)acryloyl groups are understood as including both esters, containing a free hydroxyl group, of acrylic acid or methacrylic acid with dihydric alcohols, such as 2-hydroxyethyl, 2- or 3-hydroxypropyl or 2-, 3- or 4-hydroxybutyl(meth)acrylate, and mixtures of such compounds. Monohydric alcohols containing (meth) acryloyl groups or reaction products substantially containing such alcohols, which are obtained by esterification of n-hydric alcohols with (meth)acrylic acid, are also possible. It is also possible to employ mixtures of different alcohols, so that n represents an integer or a fractional number from 2 to 4, preferably 3(n-0.8) to (n-1.2), preferably (n-1) mol of (meth) acrylic acid is employed per mol of the alcohols mentioned. These compounds or product mixtures include the reaction products of i) glycerol, trimethylolpropane and/or pentaerythritol, low molecular weight alkoxylation products of such alcohols (such as ethoxylated or propoxylated trimethylolpropane, for example the addition product of ethylene oxide on trimethylolpropane of OH number 550), or of mixtures of such at least trihydric alcohols with dihydric alcohols (such as ethylene glycol or propylene glycol), with ii) (meth) acrylic acid in the molar ratio mentioned.

These compounds have a number-average molecular weight Mn of 116 to 1,000, preferably 116 to 750, and more preferably 116 to 158.

Some specific examples of suitable acrylate-functional materials in include hydroxymethyl(meth)acrylate (HEA), hydroxypropyl(meth)acrylate (HPA), trimethylol propane di(meth)acrylate, pentaerythritol tri(meth)acrylate, GAMA ((meth)acrylic acid adduct of glycidyl(meth)acrylate), which can include the two isomers

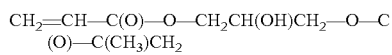

and

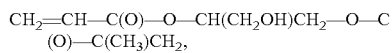

or a polycaprolactone hydroxy ethyl(meth)acrylate (PCHEA) can be used, however any hydroxyl functional (meth)acrylate can be used as described in the above defined structure.

In a particular embodiment of the invention, PCHEA is used either alone or in mixtures with other hydroxy functional (meth)acrylates to achieve low viscosity materials.

In an additional embodiment of the invention, the PCHEA is TONE® M 100 (poly(ε-caprolactone) ester of 2-hydroxyethyl acrylate) available from DOW Chemical Corp., Midland Mich.

In another particular embodiment of the invention, HEA or HPA are useful as the sole hydroxy functional acrylate, however, in some cases, these materials tend to crystallize, so that the resin cannot be used neat, but must be dissolved. Solvents, typically ester, ether or hydrocarbon solvents can be used. Esters which are particularly useful also have acrylic functionality, such as hexanediol diacrylate, which would make the solution 100% reactive under UV/EB conditions.

Suitable di- or polyisocyanates include aromatic, araliphatic, cycloaliphatic, and aliphatic compounds, aliphatic compounds being preferred. Examples include butylene-diisocyanate, hexamethylene-diisocyanate (HDI), isophorone-diisocyanate (IPDI), trimethylhexamethylene-diisocyanate (2,2,4- and/or 2,4,4-trimethylhexa-methylene-diisocyanate), neopentyl diisocyanate, dicyclohexylmethane-diisocyanate or 4-isocyanatomethyl-1, 8-octane-diisocyanate and derivatives of these diisocyanates containing with a urethane, isocyanurate, allophanate, biuret, uretdione and/or iminooxadiazinedione groups. Di- or polyisocyanates which contain urethane groups and are based on di- or polyisocyanates and dihydric alcohols are also suitable.

A particularly preferred acrylate-functional polyisocyanate is Desmolux® VP LS 2337, available from Bayer MaterialScience of Pittsburgh, Pa.

When an acrylate-functional polyisocyanate is used in the coating composition, the amount of polyisocyanate is reduced, to maintain the desired ratio of isocyanate groups to isocyanate-reactive groups. One skilled in the art is able to adjust the amounts of these compounds to achieve the desired properties in the coating composition.

The coating compositions of the present invention further include initiators of a free-radical polymerization, which can be activated thermally and/or by radiation. Photoinitiators, which are activated by UV or visible light, are preferred in this context. Photoinitiators are compounds known per se, being sold commercially, a distinction being made between unimolecular (type I) and bimolecular (type II) initiators. Suitable (type I) systems are aromatic ketone compounds, e.g. benzophenones in combination with tertiary amines, alkylbenzophenones, 4,4'-bis(dimethylamino)benzophenone (Michler's ketone), anthrone and halogenated benzophenones or mixtures of the types stated. Of further suitability are (type II) initiators such as benzoin and its derivatives, benzil ketals, acylphosphine oxides, 2,4,6-trimethylbenzoyldiphenylphosphine oxide for example, bisacylphosphine oxides, phenylglyoxylic esters, camphorquinone, .alpha.-aminoalkylphenones, .alpha., alpha.-dialkoxyacetophenones and .alpha.-hydroxyalkylphenones.

The initiators, which are used in amounts between 0.1% and 10% by weight, preferably 0.1% to 5% by weight, based on the weight of the film-forming binder, can be used as an individual substance or, on account of frequent advantageous synergistic effects, in combination with one another.

Where electron beams-are used instead of UV radiation there is no need for a photoinitiator. Electron beams, as is known to the skilled person, are generated by means of thermal emission and accelerated by way of a potential difference. The high-energy electrons then pass through a titanium foil and are guided onto the binders to be cured. The general principles of electron beam curing are described in detail in "Chemistry & Technology of UV & EB Formulations for Coatings, Inks & Paints", Vol. 1, P K T Oldring (Ed.), SITA Technology, London, England, pp. 101-157, 1991.

In the event of thermal curing of the activated double bonds, this can also take place with addition of thermally decomposing free-radical initiators. Suitability is possessed, as is known to the skilled person, by, for example, peroxy compounds such as dialkoxy dicarbonates such as, for example, bis(4-tert-butylcyclohexyl)-peroxydicarbonate, dialkyl peroxides such as, for example, dilauryl peroxide, peresters of aromatic or aliphatic acids such as, for example, tert-butyl perbenzoate or tert-amyl peroxy 2-ethylhexanoate, inorganic peroxides such as, for example, ammonium peroxodisulphate, potassium peroxodisulphate, organic peroxides such as, for example, 2,2-bis(tert-butylperoxy)butane, dicumyl peroxide, tert-butyl hydroperoxide or else azo compounds such as 2,2'-azobis[N-(2-propenyl)-2-methylpropionamides], 1-[(cyano-1-methylethyl)azo]formamides, 2,2'-azobis(N-butyl-2-methylpropionamides), 2,2'-azobis(N-cyclohexyl-2-methylpropionamides), 2,2'-azobis{2-methyl-N-[2-(1-hydroxybutyl)]propionamides}, 2,2'-azobis{2-methyl-N-[2-(1-hydroxybutyl)]propionamides, 2,2'-azobis{2-methyl-N-[1,1-bis(hydroxymethyl)-2-hydroxyethyl]propionamides. Also possible are highly substituted 1,2-diphenylethanes(benzpinacols), such as, for example, 3,4-dimethyl-3,4-diphenylhexane, 1,1,2,2-tetraphenylethane-1,2-diol or else the silylated derivatives thereof.

It is also possible to use a combination of initiators activable by UV light and thermally.

Coating compositions of the present invention further optionally include one or more reactive diluents. Any suitable reactive diluent can be used in the present composition.

As reactive diluents it is possible to use compounds which in the course of UV curing are likewise (co)polymerized and hence incorporated into the polymer network and are inert towards NCO groups. Such reactive diluents are described exemplarily, by way of example, in P. K. T. Oldring (Ed.), Chemistry & Technology of UV & EB Formulations For Coatings, Inks & Paints, Vol. 2, 1991, SITA Technology, London, pp. 237-285. They may be esters of acrylic acid or methacrylic acid, preferably of acrylic acid, with mono- or polyfunctional alcohols. Examples of suitable alcohols include the isomeric butanols, pentanols, hexanols, heptanols, octanols, nonanols and decanols, and also cycloaliphatic alcohols such as isobornol, cyclohexanol and alkylated cyclohexanols, dicyclo-pentanol, arylaliphatic alcohols such as phenoxyethanol and nonylphenylethanol, and tetrahydrofurfuryl alcohols.

Additionally it is possible to use alkoxylated derivatives of these alcohols. Suitable dihydric alcohols are, for example, alcohols such as ethylene glycol, propane-1,2-diol, propane-1,3-diol, diethylene glycol, dipropylene glycol, the isomeric butanediols, neopentyl glycol, hexane-1,6-diol, 2-ethylhexanediol and tripropylene glycol or else alkoxylated derivatives of these alcohols. Preferred dihydric alcohols are hexane-1,6-diol, dipropylene glycol and tripropylene glycol. Suitable trihydric alcohols are glycerol or trimethylolpropane or their alkoxylated derivatives. Tetrahydric alcohols are pentaerythritol or its alkoxylated derivatives.

Additional suitable reactive diluents include alkyl mono-, di- tri- and tetra(meth)acrylates, any of which can contain epoxy groups, wherein the alkyl is an alkyl group of from 1 to 8 carbon atoms, and bis-acrylates of alkanediols, optionally containing ether oxygen atoms, provided that the bis-acrylates have a molecular weight of less than 350. These bis-acrylates may be mixed with up to 20 wt %, based on the total weight of the reactive diluent used, of other acrylic esters of tri- to hexafunctional alcohols. Suitable bis-acrylates include dipropylene glycol diacrylate, tripropylene glycol diacrylate, 1,4-butanediol diacrylate and 1,6-hexanediol diacrylate. Suitable acrylic esters of higher alcohols include trimethylolpropane triacrylate, pentaerythritol tetraacrylate or sorbitol hexaacrylate. A particularly preferred reactive diluent is 1,6-hexanediol diacrylate, such as Sartomer® SR-238, available from Sartomer Company of Exon, Pa.

The compositions according to the invention can also be employed in a form diluted by solvents. Examples of suitable solvents include acetone, 2-butanone, ethyl acetate, n-butyl acetate, methoxypropyl acetate or low molecular weight esters of (meth)acrylic acid. Such mono-, di- or oligoesters of (meth)acrylic acid are known compounds in coating technology and are called reactive thinners and, as compounds which polymerize in during curing, lower the viscosity of the non-cured coating. Such compounds are described in P. K. T. Oldring (ed.), Chemistry & Technology of UV & EB Formulations for Coatings, Inks & Paints, vol. 2, 1991, SITA Technology, London p. 237-235. Examples include the esters of acrylic acid or methacrylic acid, preferably acrylic acid, with mono-, di-, tri- and polyalcohols. Suitable monohydric alcohols (monoalcohols) include the isomeric butanols, pentanols, hexanols, heptanols, octanols, nonanols and decanols; cycloaliphatic alcohols such as isobomol, cyclohexanol and alkylated cyclohexanols and dicyclopentanol; aryl-aliphatic alcohols such as phenoxyethanol and nonylphenylethanol; and tetrahydrofurfuryl alcohols. Alkoxylated derivatives of these alcohols can furthermore be used.

The components of the coating composition, e.g., polyaspartate, polyisocyanate, acrylate-containing compound and optional acrylate-containing polyisocyanate and reactive diluent, are mixed together in a known manner. Typically the polyisocyanate is added last, although this order is not required.

The coating compositions according to the invention can be mixed with known additives. These include fillers, fiberglass, stabilizers, adhesion promoters, catalysts, pigments, dyestuffs, thixotropic agents, leveling agents, antistatic agents, antioxidants, matting agents or flow agents, which are employed in the conventional amounts.

The coating system according to the invention can preferably be applied via spray, casting or roller application.

The coating system according to the invention is used for coating wood, film, plastics, leather, mineral substrates, metals (such as metal sheets, which may also be pretreated, and copper, for example in the form of wires) and substrates which have already been lacquered or coated. Some specific non-limiting examples of suitable substrates can include, but are not limited to, natural and/or synthetic stone, ceramic, glass, brick, cement, concrete, cinderblock, wood and composites and laminates thereof; wallboard, drywall, sheetrock, cement board, plastic, paper, PVC, styrofoam, plastic composites, acrylic composites, ballistic composites, asphalt, fiberglass, soil, gravel and the like. Metals can include but are not limited to aluminum, cold rolled steel, electrogalvanized steel, hot dipped galvanized steel, titanium and alloys; plastics can include but are not limited to TPO, SMC, TPU, polypropylene, polycarbonate, polyethylene, polyamides (Nylon). The substrates can be primed metal and/or plastic; that is, an organic or inorganic layer is applied thereto. Further, the coating compositions of the present invention can be applied to said substrates to impart one or more of a wide variety of properties such as but not limited to corrosion resistance, abrasion resistance, impact damage, flame and/or heat resistance, chemical resistance, UV light resistance, structural integrity, ballistic mitigation, blast mitigation, sound dampening, decoration and the like. In non-limiting examples, the coating compositions of the present invention can be applied to at least a portion of a building structure or an article of manufacture. The article of manufacture can be a building structure. "Building structure" includes but is not limited to at least a portion of a structure including residential, commercial and military structures, for example, roofs, floors, support beams, walls and the like. As used herein, the term "substrate" may refer to a surface, either external or internal, on at least a portion of an article of manufacture or the article of manufacture itself. In an embodiment, the substrate is a truck bed.

Curing of the coatings according to the invention is carried out by exposure to actinic radiation, preferably by exposure to high-energy radiation, i.e. UV radiation or daylight, e.g. light with a wavelength of 200 to 750 nm, or by bombardment with high-energy electrons (electron beams, 150 to 300 keV). Examples of radiation sources used for light or UV light include high-pressure mercury vapor lamps. It is possible for the mercury vapor to have been modified by doping with other elements such as gallium or iron. Lasers, pulsed lamps (known under the designation UV flashlight lamps), halogen lamps or excimer emitters are also suitable. UV-A curing can be effected with a Panacol UV-F 900 UV-A lamp from Panacol-Elosol GmbH, Germany. The lamps may be stationary so that the material to be irradiated is moved past the radiation source by means of a mechanical apparatus, or the lamps may be mobile and the material to be irradiated remains stationary in the course of curing. The radiation dose that is normally sufficient for crosslinking in the case of UV curing is 80 to 5000 mJ/cm$^2$.

The nature and concentration of any initiator used are to be varied in known manner in accordance with the radiation dose and curing conditions. For applications that are cured with sunlight, photoinitiators that are activated by UV-A and/or visible light are preferred. Photoinitiators are commercially available compounds known per se which fall into two types: unimolecular (type I) and bimolecular (type II) initiators. Examples of type I systems are aromatic ketone compounds, e.g. benzophenones in combination with tertiary amines, alkylbenzophenones, 4,4'-bis(dimethylamino)-benzophenone (Michler's ketone), anthrone and halogenated benzophenones, or mixtures of said types. Also suitable are type II initiators such as benzoin and its derivatives, benzil ketals, acylphosphine oxides, e.g. 2,4,6-trimethylbenzoyl-diphenylphosphine oxide, bisacylphosphine oxides, phenylglyoxylic acid esters, camphorquinone, α-aminoalkylphenones, α α-dialkoxyacetophenones and α-hydroxyalkylphenones. It may also be advantageous to use mixtures of these compounds. The type and concentration of photoinitiator must be adapted, in a manner known to those skilled in the art, according to the radiation source used for curing. A more detailed description can be found e.g. in P. K. T. Oldring (Ed.), Chemistry & Technology of UV & EB Formulations for Coatings, Inks & Paints, Vol. 3, 1991, SITA Technology, London, pp 61-328.

In a preferred embodiment, when coatings of the invention are applied to exterior surfaces of buildings or roads, curing is accomplished by the action of sunlight or ambient light. Curing is complete within an hour or less, preferably 45 minutes or less, more preferably 40 minutes or less.

EXAMPLES

The following examples are intended to illustrate the invention and should not be construed as limiting the invention in any way.

Example 1

Preparation of Clear Polyurea/Urethane Acrylate Dual Cure

| Material | Description | Supplier |
|---|---|---|
| Desmophen ® NH 1420 | Polyaspartic Ester | Bayer MaterialScience |
| Desmolux ® VP LS 2308 | Urethane Acrylate | Bayer MaterialScience |
| Sartomer ® SR-238 | Reactive Diluent | Sartomer |
| Desmodur ® XP-2410 | polyisocyanate | Bayer MaterialScience |
| Desmolux ® VP LS 2337 | Acrylate functional polyisocyanate | Bayer MaterialScience |
| Lucirin ® TPO-L | Photinitiator | BASF |

|  | A (Control) | B | C | D | E (Control) |
|---|---|---|---|---|---|
| Desmophen ® NH 1420 | 55.09 g | 45.45 g | 34.6 g | 20.16 g | |
| Desmolux ® VP LS 2308 | | 8.02 g | 18.81 g | 34.08 g | 60 g |
| Sartomer ® SR-238 | | 5.35 g | 12.54 g | 22.72 g | 40 g |
| Desmodur ® XP-2410 | 44.91 g | 35.46 g | 27.72 g | 17.42 g | |
| Desmolux ® VP LS 2337 | | 3.94 g | 3.88 g | 1.94 g | |
| Lucirin ® TPO-L | 5 g | 5 g | 5 g | 5 g | 5 g |

Preparation of Polyaspartic Dual Cure:

The polyaspartic ester material was weighed into a 100 g plastic mixing cup. After the addition of the polyaspartic ester, the Desmolux 2308 and Sartomer SR 238 was weighed into the cup. The material was mixed for 30 seconds of the spin mixer, (Flacktek speed mixer DAC 400FVZ), at ~20,000 rmps. Once the sample was homogeneous, the polyisocyanates (Desmodur 2410 and 2337) were added to the cup. When all the material was added into the cup, the photoinitiator was charged. The sample was mixed using the spin mixer for 1-minute at 20,000 rmps.

Multiple samples of each formulation (A-E) were drawn down on 3"×6" glass panels at 10 mils wet thickness. The samples were allowed to sit for 30 minutes prior to any type of UV irradiation taking place.

After the initial 30-minute time period, one set of samples were set in ambient light, another set were cured for 4 minutes at 10 inches distance on the H&S Autoshot light (UVA 400 415 watts), the final set of samples were cured using the Hg bulb on the Fusion high intensity light (Fusion UV/Microwave).

The microhardness (HM) of the samples were measured periodically over a 2-week time period. The microhardness was measured on a Fischerscope HC100 microindentor with an x-y programmable stage. The indentor impacts the surface at a given force, based upon the damage inflicted the hardness (HM) of the material is determined. The data is summarized in Table 1 showing the changes in properties as the ratio of UV and polyurea are varied. Table 1 illustrates that the materials containing UV components are curing by exposure to UV light. Table 1 also shows that the material gaining a higher hardness at a more rapid rate than the traditionally cure polyaspartic ester (PAE). One can also see that under ambient conditions the systems containing only UV or predominately UV characteristic do not establish enough properties for testing. System containing higher percentages of the polyaspartic coating will physically dry even without exposure to UV irradiation.

TABLE 1

Microhardness data

| System | PAE (% weight) | UV (% weight) | Cure | HM 4 HR | HM 1 Day | HM 7 Day | HM 14 day |
|---|---|---|---|---|---|---|---|
| A | 100 | 0 | Ambient | ND | 114.81 | 122.92 | 123.08 |
| B | 75 | 25 | Ambient | ND | 3.32 | 6.02 | 6.23 |
| C | 50 | 50 | Ambient | ND | 0.21 | 0.30 | 0.41 |
| D | 25 | 75 | Ambient | ND | ND | ND | ND |
| E | 0 | 100 | Ambient | ND | ND | ND | ND |
| B | 75 | 25 | Autoshot | ND | 109.61 | 127.81 | 133.10 |
| C | 50 | 50 | Autoshot | ND | 74.27 | 94.73 | 110.30 |
| D | 25 | 75 | Autoshot | ND | 59.81 | 80.34 | 85.98 |
| E | 0 | 100 | Autoshot | ND | 138.58 | 148.93 | 151.40 |
| B | 75 | 25 | Fusion | ND | 119.15 | 131.76 | 136.05 |
| C | 50 | 50 | Fusion | ND | 122.32 | 133.88 | 136.71 |
| D | 25 | 75 | Fusion | ND | 132.38 | 140.33 | 141.82 |
| E | 0 | 100 | Fusion | ND | 143.67 | 151.61 | 154.69 |

The chemical resistance of the coating was assessed by the determination of the damage inflicted on the coating by the placement of a cotton ball soaked in various aggressive solvents. The cotton ball is placed on the coating surface for specific time periods to determine the effect over a significant time period of exposure. The solvents used in the study were isopropanol (IPA) and Toluene. The analysis was completed 14-day after preparation to ensure a complete cure had taken place. The system that contains only UV components (E) when exposed to ambient light does not cure sufficiently for testing. With exposure to UV Irradiation, one can see the chemical resistance to solvents increase with increasing UV content. This information is summarized in Table 2.

TABLE 2

Chemical resistance data

| System | PAE (% weight) | UV (% weight) | Cure | Toluene (1 hr) | IPA (1 hr) | Toluene (4 hr) | IPA (4 hr) |
|---|---|---|---|---|---|---|---|
| A | 100 | 0 | Ambient | Soften | SI Soften | Blister | Blister |
| B | 75 | 25 | Ambient | Blister | Blister | Blister | Blister |
| C | 50 | 50 | Ambient | Blister | Blister | Blister | Blister |
| D | 25 | 75 | Ambient | Blister | Blister | Blister | Blister |
| E | 0 | 100 | Ambient | No Data | No Data | No Data | No Data |
| B | 75 | 25 | Autoshot | Soften | No Effect | Blister | SI Soften |
| C | 50 | 50 | Autoshot | No Effect | No Effect | SI Soften | No Effect |
| D | 25 | 75 | Autoshot | No Effect | No Effect | No Effect | No Effect |
| E | 0 | 100 | Autoshot | No Effect | No Effect | No Effect | No Effect |
| B | 75 | 25 | Fusion | Soften | No Effect | Soften | SI Soften |
| C | 50 | 50 | Fusion | No Effect | No Effect | SI Soften | No Effect |
| D | 25 | 75 | Fosion | No Effect | No Effect | No Effect | No Effect |
| E | 0 | 100 | Fusion | No Effect | No Effect | No Effect | No Effect |

| Material | Description | Supplier |
|---|---|---|
| Desmophen NH 1420 | Polyaspartic Ester | Bayer MaterialScience |
| Desmophen NH 1520 | Polyaspartic ester | Bayer MaterialScience |
| Desmolux XP 2513 | Urethane Acrylate | Bayer MaterialScience |
| Desmolux VP LS 2308 | Urethane Acrylate | Bayer MaterialScience |
| Sartomer SR-238 | Reactive Diluent | Sartomer |
| Desmodur XP-2410 | Polyisocyanate | Bayer MaterialScience |
| Desmolux VP LS 2337 | Acrylate functional polyisocyanate | Bayer MaterialScience |
| Lucirin TPO-L | Photoinitiator | BASF |
| Irgacure 184 | Photoinitiator | Ciba |

-continued

| | A (Control) | B | C | D |
|---|---|---|---|---|
| Desmophen NH 1420 | 29.57 g | 39.11 g | 29.57 g | 17.15 g |
| Desmophen NH 1520 | 14.83 g | 19.55 g | 14.83 g | 8.53 g |
| Desmolux VP LS 2308 | | 7.82 g | 17.76 g | 30.82 g |
| Desmolux XP 2513 | | 7.82 g | 17.76 g | 30.82 g |
| Sartomer SR-238 | | 3.91 g | 8.88 g | 15.41 g |
| Desmodur XP-2410 | 25.33 g | 32.75 g | 25.33 g | 15.60 g |
| Desmolux VP LS 2337 | 10.86 g | 14.03 | 10.86 g | 6.68 g |
| Lucirin TPO-L | | 0.625 g | 0.625 g | 0.625 g |

-continued

| | | | |
|---|---|---|---|
| Irgacure 184 (50:50 in 238) | 3.75 g | 3.75 g | 3.75 g |

The previously described matrix was prepared by weighing each material into a plastic mixing cup. When all materials were added into the cup the material was mixed for one minute at ~20,000 rpm on the spin mixer. Approximately 100 g of the mixed material was poured into a 2 oz jar for viscosity measurements. The viscosity measurements were made on a Brookfiled DV-I+ viscometer. Along with the viscosity measurements, dry time of the material was monitored.

TABLE 3

Viscosity Measurements:

| Time | A (Control) | B | C | D |
|---|---|---|---|---|
| Initial | 1962 cPs | 1170 cPs | 940 cPs | 749 cPs |
| 10 minutes | 4360 cPs | 2600 cPs | 1570 cPs | 880 cPs |
| 20 minutes | 13880 cPs | 6610 cPs | 2840 cPs | 1190 cPs |
| 30 minutes | 50000 cPs | 16610 cPs | 4955 cPs | 1470 cPs |

The samples were drawn down on glass panels at 5 mils wet film thickness. The samples containing UV curable agents were allowed to sit for 30 minutes and then cure with a high intensity UV light. After the cure period, the panels were monitored to determine the length of time (including the initial set time) required before the sample had hard dried characteristics. The sample without UV components was simply monitored for hard dry characteristics. The hard dry characteristics were determined by the placement of a cotton ball on the film and determining when the material will not pick up any fibers from the cotton ball.

TABLE 4

Dry Time:

| System | Cure |
|---|---|
| A | 1-hour Hard Dry |
| B | 30-minute set, UV cure, Hard dry 1 hr |
| C | 30-minute set, UV cure, Hard dry 1 hr |
| D | 30-minute set, UV cure, Hard dry 1 hr |

Example 3

Preparation of Thick Film Pigmented Polyurea/Urethane Acrylate Dual Cure

| Material | Description | Supplier |
|---|---|---|
| Desmophen NH 1420 | Polyaspartic Ester | Bayer MaterialScience |
| Desmolux VP LS 2308 | Urethane Acrylate | Bayer MaterialScience |
| Desmolux VP LS 2513 | Urethane Acrylate | Bayer MaterialScience |
| Sartomer SR 238 | Reactive Diluent | Sartomer |
| Ti-Pure R-960 | Pigment | DuPont |
| UOP L Powder | Molecular Sieve | UOP |
| Desmodur XP 2410 | Polyisocyanate | Bayer MaterialScience |
| Desmolux VP LS 2337 | Acrylate Functional Polyisocyanate | Bayer MaterialScience |
| Irgacure 2100 | Photoinitiator | Ciba |

-continued

| | A | B (Control) |
|---|---|---|
| Component 1 | | |
| Desmophen NH 1420 | 280.40 g | |
| Desmolux XP 2513 | 61.69 g | 20 g |
| Desmolux VP LS 2308 | | 80 g |
| Sartomer SR-238 | | 20 g |
| Irgacure 2100 | 52.28 g | 5.5 g |
| Ti-Pure R-960 | 162.7 g | 22 g |
| Component 2 | | |
| Desmolux VP LS 2308 | 142.0 g | |
| Sartomer SR-238 | 28.04 g | |
| Desmolux XP 2513 | 50.47 g | |
| Desmodur XP 2410 | 224.63 g | |
| Desmolux VP LS 2337 | 24.96 g | |

Preparation of A:

Desmophen NH 1420 was weighed into a quart can. The can was placed under a cowles blade for dispersion of the pigment. The blade was placed in the sample and mixed under low shear for a few minutes. The Ti-Pure was weighed out and added slowly into the mixing material. Once all the Ti-Pure had been added into the can the UOP powder was added and the material was left mixing at moderate shear for 30 minutes. Once the sample reached a uniform consistency the cowles blade was turned off and the can removed.

The additional materials were weighed into the can. When all of the materials for component 1 had been added, the can was placed on the paint shaker, (Red Devil Model #5KC43HG2464EY), and vigorously mixed for 20 minutes.

All of the materials for component 2 were weighed into a second quart can. When all the material had been added, the can was shaken on the paint shaker for 20 minutes, and left to sit for 24 hours to de-areate before the samples can be applied.

Preparation of B:

Desmolux VP LS 2308 was weighed into a quart can. The can was placed under a cowles blade for dispersion of the pigment, and mixed under low shear for a few minutes. The Ti-Pure was weighed out and added slowly into the mixing material. Once all the Ti-Pure had been added the UOP powder was added and the material was left mixing at moderate shear for 30 minutes. Once the sample had reached a uniform consistency the cowles blade was turned off and the can removed.

The additional materials were weighed into the can, which was then placed on the paint shaker, (Red Devil Model # 5KC43HG2464EY), and vigorously mixed for 20 minutes.

Application—

The material can be applied using brushes, rollers or drawing the sample down. A good through cure is found in excess of 20 mils wet.

Alternatively the material can be applied by low pressure cartridge gun application. Component 1 is added into a plastic cartridge and component 2 can be added to a second cartridge. Once the cartridges are filled to the appropriate level the sample can be applied using low pressure application. The mixing of the sample takes place at in a static mixer placed at the end of the 2 cartridges. The material cures by the exposure to the UV irradiation from the sun. After a 20-minute time period the coating can withstand mechanical traffic.

The material (B) that does not contain the polyaspartic characteristics will not through cure when exposed to the sun above 25 mils wet film thickness in a coating containing a 0.2 p/b ratio.

Example 4

Preparation of Thin Film Pigmented Polyurea/Urethane Acrylate Dual Cure

| Material | Description | Supplier |
|---|---|---|
| Desmophen NH 1420 | Polyaspartic Ester | Bayer MaterialScience |
| Desmophen NH 1520 | Polyaspartic Ester | Bayer MaterialScience |
| Sartomer SR-238 | Reactive Diluent | Sartomer |
| Sartomer CD-572 | Reactive Diluent | Sartomer |
| Desmolux VP LS 2308 | Urethane Acrylate | Bayer MaterialScience |
| Dabco T-12 | Catalyst | Air Products |
| Desmodur XP 2410 | Polyisocyanate | Bayer MaterialScience |
| Desmolux VP LS 2337 | Acrylate Functional Polyisocyanate | Bayer MaterialScience |
| Irgacure 2100 | Photoinitiator | Ciba |
| Irgacure 184 | Photoinitiator | Ciba |

|  | A | B (Control) |
|---|---|---|
| Component 1 | | |
| Desmophen NH 1420 | 262.97 g | |
| Desmophen NH 1520 | 262.97 g | |
| Desmolux VP LS 2308 | 131.39 g | 80 g |
| Desmolux XP 2513 | | 20 g |
| Sartomer SR-238 | 52.55 | 20 g |
| Sartomer CD 572 | 210.41 | |
| Dabco T-12 (10% in n-Butyl acetate) | 0.39 g | |
| Irgacure 2100 | 98.05 | 5.5 g |
| Irgacure 184 (50:50 wt in SR-238) | 30 g | 3 |
| Commercial grey pigment paste | 74 g | 3.7 g |
| Component 2 | | |
| Desmolux VP LS 2308 | 31.39 | |
| Desmodur XP 2410 | 231.40 | |
| Desmolux VP LS 2337 | 540.05 g | |
| Acetone | 78.44 g | |
| Irgacure 184 (50:50 wt in SR-238) | 30 g | |

Component 1 was mixed into a half-gallon metal can. When all ingredients were in the can, the sample was mixed vigorously on the paint shaker for 10 minutes. The same process was performed on component 2. Upon completion of the mixing step the samples sat for 24-hours to eliminate any air that might have been introduced through mixing. The material was at a 1:1 volume ratio. Component 1 and 2 were added together, and hand stirred for mixing. The pigment paste can be added and stirred to mix. When the material is homogeneous, the sample can be poured for a roller application. The coating can be applied at ~10 mils on various substrates including glass, metal and concrete.

The sample is allowed to cure for at least 45 minutes. After this period of time has passed the sample can be UV cured. Several methods of cured can be used including UVA (H&S Autoshot 4 minutes, at a distance of 10 inches from the substrate), and high intensity UV (Fusion, Hg bulb). Upon completion of the irradiation, the coating is physically dry. The coating sample will continue to harden over time.

The material (B) that does not contain the polyaspartic characteristics will not through cure with the high pigment ratio and thick film build.

Example 5

Preparation of Thick Polyurea/Urethane Acrylate Dual Cure for Clear Coating Applications

| Material | Description | Supplier |
|---|---|---|
| Desmophen NH 1420 | Polyaspartic Ester | Bayer MaterialScience |
| Desmophen NH 1520 | Polyaspartic Ester | Bayer MaterialScience |
| Desmophen XP-7076 | Aldimine | Bayer MaterialScience |
| Sartomer SR-238 | Reactive Diluent | Sartomer |
| Desmolux VP LS 2308 | Urethane Acrylate | Bayer MaterialScience |
| Desmolux XP 2513 | Urethane Acrylate | Bayer MaterialScience |
| Desmodur XP 2410 | Polyisocyanate | Bayer MaterialScience |
| Desmolux VP LS 2337 | Acrylate Functional Polyisocyanate | Bayer MaterialScience |
| Lucerne TPO-L | Photoinitiator | BASF |
| Irgacure 184 | Photoinitiator | Ciba |
| Airex 980 | Additive | Tego |

|  | A | B (Control) |
|---|---|---|
| Component 1 | | |
| Desmophen NH 1420 | 30.16 g | |
| Desmophen NH 1520 | 10.34 g | |
| Desmophen XP 7076 | 2.58 g | |
| Desmolux VP LS 2308 | 17.23 g | 80 g |
| Desmolux XP 2513 | 17.23 g | 20 g |
| Sartomer SR-238 | 8.62 g | 20 g |
| Airex 980 | 1.25 g | |
| Lucirin TPO-L | 0.625 g | 0.625 g |
| Irgacure 184 (50:50 wt in SR-238) | 3.75 g | 3.75 g |
| Component 2 | | |
| Desmodur XP 2410 | 19.42 g | |
| Desmolux VP LS 2337 | 19.42 g | |

The ingredients for component 1 can be combined in a plastic spin mixer cup. When all ingredients have been added together component 1 is mixed on the speed mixer for 1 minute. Once component 1 has been mixed, component 2 can be added in. When all materials are combined the sample is mixed for 30-seconds on the spin mixer at ~20,000 rpm. Upon completion of the mixing phase, a homogeneous coating is produced, the sample can be applied. The substrate is flood coated creating a coating thickness of >50 mils. Allow the coating to set up for several hours (2-hours). After the sample has become tacky at the surface the coating can be cured with a high intensity light. Upon completion of the UV irradiation the sample's surface will be dry and hard enough to walk on.

The material that does not contain the polyaspartic characteristics shrinks and cracks badly at high film builds.

Whereas particular embodiments of this invention have been described above for purposes of illustration, it will be evident to those skilled in the art that numerous variations of the details of the present invention may be made without departing from the invention as defined in the appended claims.

What is claimed is:

1. A radiation-curable coating composition comprising
   a) an amino-functional polyaspartate;
   b) a (cyclo) aliphatic polyisocyanate;
   c) a urethane acrylate; and
   d) a photoinitiator,
wherein the urethane acrylate is essentially free from hydroxyl and isocyanate groups, and the amount of the urethane acrylate comprises 30 wt. %-85 wt. % of the composition.

2. The coating composition of claim 1, wherein the NCO:NH ratio of (a) to (b) is from 0.5 NCO:1 NH to 3 NCO:1 NH.

3. The coating composition of claim 1, wherein the amount of polyaspartate (a) and polyisocyanate (b) together comprise 15 wt. % to 70 wt. % of the composition, and the amount of photoinitiator (d) comprises 0.3 wt. % to 10 wt. % of the composition, based on the weight of the coating composition.

4. The coating composition of claim 1, wherein the amount of a) and b) combined is from 55 wt. %-65 wt. % and the amount of c) is from 35 wt. %-45 wt. %, based on the weight of the coating composition.

5. The composition of claim 1, wherein (a), the amino-functional polyaspartate corresponds to Formula I,

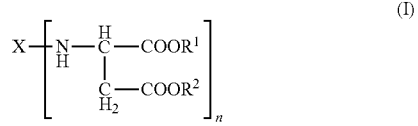

where X represents an n-valent organic group obtained by removing the primary amino groups from an n-valent polyamine, $R_1$, $R_2$ represent the same or different organic groups, which are inert to isocyanate groups under the reaction conditions, and n represents an integer of at least 2.

6. The coating composition of claim 1, wherein the one or more polyisocyanates contain urethane, uretdione, allophanate, biuret, iminooxadiazindione and/or isocyanurate groups and have an NCO group content of 5 to 25% by weight, an average NCO functionality of 2.0 to 5.0, and a residual amount of monomeric diisocyanates of below 1% by weight.

7. The coating composition of claim 6, wherein the NCO functionality is 2.8 to 4.0.

8. The composition of claim 6, wherein the residual amount of monomeric isocyanates is below 0.5% by weight.

9. The coating composition of claim 1, wherein the urethane acrylate is the reaction product of one or more isocyanurate-containing polyisocyanates and one or more compounds containing at least one isocyanate-reactive group and at least one olefinic double bond.

10. The coating composition of claim 9, wherein the compounds containing at least one isocyanate-reactive group and at least one olefinic double bond are selected from the group consisting of hydroxymethyl(meth)acrylate (HEA), hydroxypropyl(meth)acrylate (HPA), trimethylol propane di(meth)acrylate, pentaerythritol tri(meth)acrylate, (meth)acrylic acid adduct of glycidyl(meth)acrylate or a polycaprolactone hydroxy ethyl(meth)acrylate.

11. The coating composition of claim 1, further comprising a reactive diluent.

12. The coating composition of claim 11, wherein the reactive diluent is hexane diol diacrylate, and the reactive diluent is present in amounts of between 2.5 wt. % to 15 wt. %, based on the weight of the total coating composition.

13. The coating composition of claim 1, further including one or more acrylate-functional polyisocyanates.

14. The coating composition of claim 13, wherein the acrylate-functional polyisocyanate is the reaction product of one or more monohydric alcohols containing (meth)acryloyl groups and one or more di- or polyisocyanates, the equivalent ratio of NCO groups to OH groups being 1:0.2 to 1:0.8.

15. The coating composition of claim 13, further comprising one or more additives.

16. A substrate coated with the coating composition of claim 13.

17. The substrate of claim 16, wherein the substrate is asphalt.

18. The substrate of claim 16, wherein the substrate is a concrete surface.

19. The substrate of claim 16, wherein the substrate is an interior or exterior surface of a building.

20. The substrate of claim 16, wherein the cure is effected by exposure to actinic radiation.

21. The substrate of claim 20, wherein the source of actinic radiation is sunlight.

* * * * *